March 21, 1961 D. G. MANLY 2,976,299
PRODUCTION OF 2,3-DIHYDROPYRAN
Filed Oct. 28, 1958
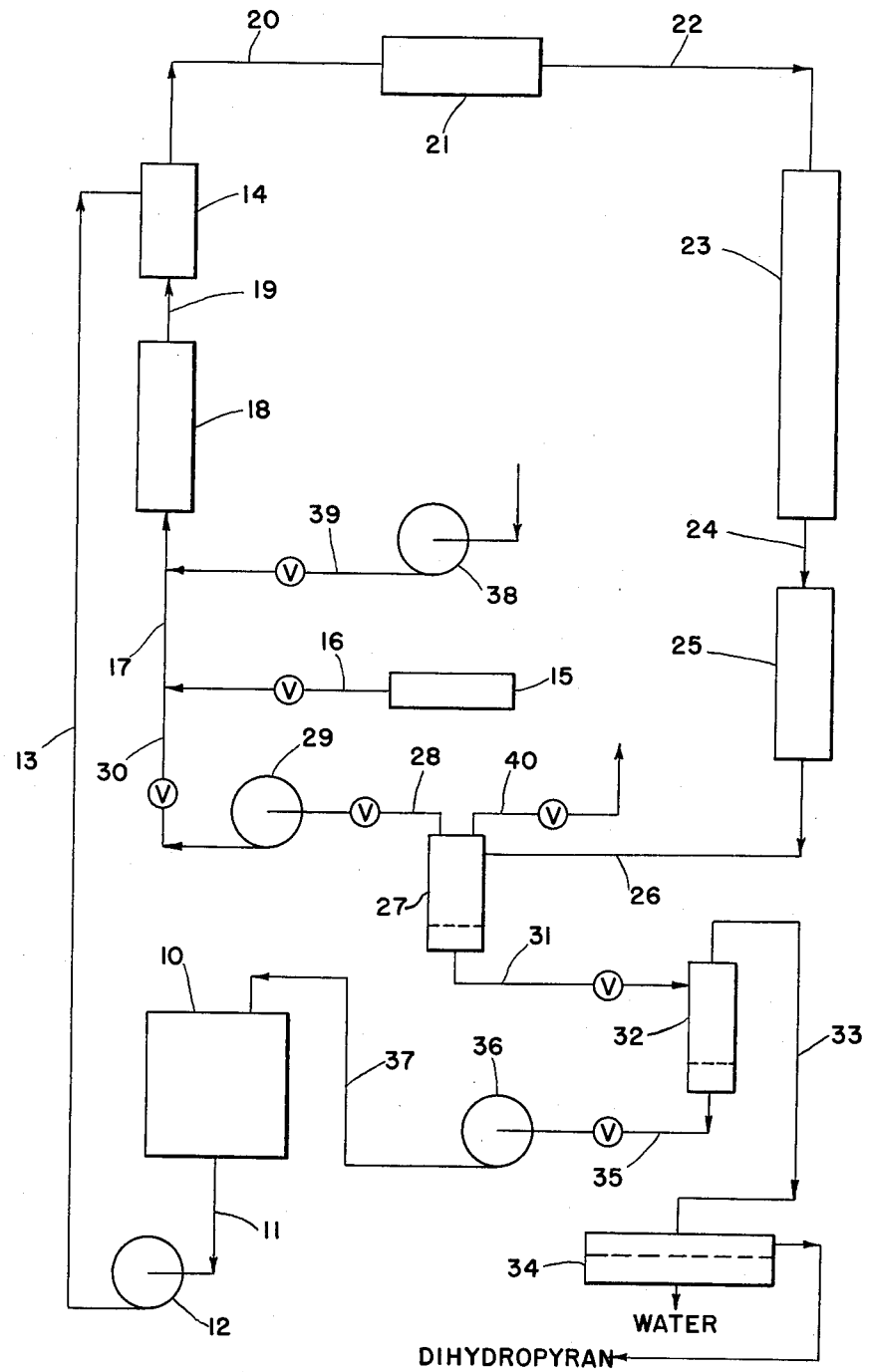
INVENTOR
Donald G. Manly
BY *Milt Hansen*
ATTORNEY United States Patent Office 2,976,299
Patented Mar. 21, 1961

2,976,299

PRODUCTION OF 2,3-DIHYDROPYRAN

Donald G. Manly, Barrington, Ill., assignor to The Quaker Oats Company, Chicago, Ill., a corporation of New Jersey Filed Oct. 28, 1958, Ser. No. 770,123

7 Claims. (Cl. 260—345.1)

This invention relates to the preparation of 2,3-dihydropyran from tetrahydrofurfuryl alcohol.

Processes are known in which tetrahydrofurfuryl alcohol in the vapor phase is passed over an alumina catalyst at a temperature in the range of 300–380° C. to produce 66–70% of dihydropyran. Not only are the yields considerably less than quantitative but the catalyst must be regenerated after three or four passes of the tetrahydrofurfuryl alcohol. To regenerate the catalyst it is ignited at red heat and because of this high temperature the catalyst must be removed from the apparatus normally used in production. Furthermore, the recovered unreacted tetrahydrofurfuryl alcohol, which comprises a considerable portion of the product, contains a high boiling impurity which turns the alcohol yellow on standing and renders it unsuitable for further runs; if it is used the yield drops to 36–38%.

Dihydropyran has also reportedly been similarly produced from tetrahydrofurfuryl alcohol when employing a granular titania catalyst prior to attaining a temperature above 400° C. in the production of acrolein. However, pure titania catalysts are not easily handled due to their fragility and when in granular form are not easily regenerated due to an uneven distribution of the tars which cause catalyst plugs.

One of the objects of the invention is to provide a vapor-phase catalytic process for producing dihydropyran in nearly quantitative yields.

Another object of the invention is to provide a catalytic process for producing dihydropyran in which the catalyst is not too fragile for ordinary handling, is easily regenerated, and has a relatively long life between regenerations.

A further object of the invention is to provide a catalytic process in which the catalyst employed permits regeneration in place at ordinary reactor temperatures.

Another object of the invention is to provide a process for producing dihydropyran from tetrahydrofurfuryl alcohol in which the recovered unreacted alcohol contains a sufficiently small amount of undesirable impurities to permit recycling and thus effect nearly quantitative conversions of the alcohol to dihydropyran.

In accordance with the invention these objects are accomplished by contacting tetrahydrofurfuryl alcohol in the vapor phase at a temperature between about 250° C. and about 350° C., preferably between about 280° C. and about 330° C., with a catalyst comprising from about 85% to about 95% by weight of titanium dioxide and from about 15% to about 5% by weight of aluminum oxide.

In a preferred embodiment of the invention the process is a continuous one in which (1) the tetrahydrofurfuryl alcohol in the vapor phase is passed through a reaction zone providing contact with the catalyst, and maintained at a temperature in the above indicated range, (2) the product vapors from the reactor are condensed, (3) the resulting condensate is distilled to separate dihydropyran from unreacted alcohol, and (4) the unreacted alcohol is returned to the reaction zone. Prior to entering the reaction zone the tetrahydrofurfuryl alcohol is preferably passed through a vaporization zone in which the alcohol is vaporized and entrained in a carrier gas such as nitrogen or hydrogen or other gas inert to the reaction involved. Subsequently, after condensation of the product vapors from the reactor, the recovered carrier gas is recycled to the vaporization zone.

The accompanying drawing illustrates a specific embodiment of the invention in which dihydropyran is produced continuously and more economically than heretofore known in the art. In this embodiment tetrahydrofurfuryl alcohol in feed tank 10 is passed through line 11, feed pump 12, and line 13 into a vaporizer 14 which is maintained at a temperature of between about 175° to about 200° C. At the same time nitrogen, hydrogen or other carrier gas under pressure in tank 15 is passed through valved line 16, line 17, a pre-heater 18, and line 19 into vaporizer 14. The pre-heater 18 raises the temperature of the carrier gas to that of vaporizer 14. The tetrahydrofurfuryl alcohol in vaporizer 14 is thereby vaporized and entrained in the carrier gas, passed through line 20, a preheater 21, and line 22 into reactor 23 wherein the entrained vapors pass through a bed of the catalyst maintained at between about 280° C. and about 330° C. The product vapors from reactor 23 pass through line 24 into condenser 25 which is cooled by any conventional means such as a cooling jacket through which cold water is circulated. The resulting condensate and carrier gas then pass through line 26 into a condensate separator 27. The carrier gas is recycled to line 17 of the above described system through valved line 28, compressor 29, and valved line 30. The liquid condensate in separator 27 is passed through valved line 31 into a still 32 at a rate slow enough to maintain a liquid seal in separator 27. Still 32 is maintained at a temperature sufficient to distill dihydropyran and water of condensation through line 33 to a decanter 34. The dihydropyran and water in decanter 34 separate into two layers so as to permit drain-off of the water and decantation of the dihydropyran. The residual liquid in still 32 which is almost entirely unreacted tetrahydrofurfuryl alcohol is drained off through valved line 35 and returned to feed tank 10 by means of gravity or a pump 36 and line 37.

During the above operation all of the mentioned valved lines are fully opened or throttled to the proper degree which can be readily determined by one skilled in the art. All other valved lines illustrated in the accompanying drawing but not yet mentioned are closed.

All of the equipment is of conventional design. Units 14, 18, 21 and 23 are heated by any conventional means such as heating jackets through which heated oil is circulated.

When the catalyst in reactor 23 requires regeneration pumps 12 and 36 and compressor 29 are shut off, and valved lines 16, 28, 30 and 31 are closed. The remaining illustrated valves are then opened and air compressor 38 is started to send air through valved line 39, pre-heater 18, line 19, vaporizer 14, line 20, pre-heater 21, line 22, reactor 23, line 24, condenser 25, line 26, separator 27 and valved line 40, the latter serving as a vent for the gaseous products of regeneration. The temperature in reactor 23 is preferably maintained below 500° C., more preferably below about 300° C., by throttling the valve in valved line 39.

It is also contemplated to avoid shut-downs in production due to regeneration by having an alternate reactor charged with catalyst alongside the single reactor 23. While one reactor is used in actual production, the other can be regenerating.

The invention will be further illustrated but is not limited by the following examples in which quantities of reactants are in parts by weight unless otherwise indicated. Yields of the product were calculated from analytical data obtained by vapor phase chromatography. In each example the catalyst employed was a pelleted mixture comprising about 90% by weight of titanium dioxide and 10% by weight of aluminum oxide.

*Example 1*

Tetrahydrofurfuryl alcohol, vaporized and entrained in a pre-heated stream of nitrogen, was passed through a bed of catalyst maintained at a temperature of about 320° C. The feed rate was 0.107 part of alcohol per part of catalyst per hour. The gas flow was maintained at about 96 liters of nitrogen per mole of alcohol fed per hour. The product vapors from the catalyst bed were condensed and the resulting condensate distilled to yield a distillate analyzing 95% by weight of dihydropyran. The amount of alcohol converted was 97% by weight. The distillation residue largely comprising tetrahydrofurfuryl alcohol was reused in later runs without any noticeable decrease in yields or conversions. In the above and subsequent runs about 10 parts of tetrahydrofurfuryl alcohol were fed over 1 part of catalyst before any noticeable decrease in activity was observed. When activity of the catalyst had decreased to such an extent that regeneration was required a stream of air was passed over the catalyst at a rate of 10 liters of air per gram catalyst per hour. The regeneration was complete in 5 hours employing a maximum temperature of 380° C. In subsequent regenerations the catalyst was regenerated by passage of air through the catalyst at a rate of 75 liters per mole catalyst per hour and employing a maximum temperature of 695° C. The latter regenerations were completed in 30 minutes.

*Example 2*

A system was employed like that described for the accompanying drawing. The tetrahydrofurfuryl alcohol was fed at a feed rate of 0.073 part of alcohol per part catalyst per hour. The carrier gas was nitrogen and had a flow rate of 138 liters per hour per mole of alcohol fed. The catalyst was the same as that employed in Example 1. The reactor temperature was about 324° C. Conversion of alcohol to product at the start was about 98%. The unconverted alcohol was returned to feed tank 10 as described above for the accompanying drawing. The yield of dihydropyran from each portion of alcohol converted was about 95% by weight. After about 20 days of continuous operation the conversion rate dropped to about 70% by weight. The catalyst was then regenerated in place by heating at temperatures of 300°–350° C. as described in the above description for the accompanying drawing.

From the above examples it is apparent that by the process of the invention dihydropyran is produced in nearly quantitative yields. Actual outputs are further increased by the fact that the recovered unconverted tetrahydrofurfuryl alcohol is of such purity as to permit recycling. Furthermore, the catalyst employed has advantages over prior art catalysts in that it is not too fragile for ordinary handling, is easily regenerated, and has a relatively long life between regenerations. Still another advantage is that the catalyst may be regenerated in place at ordinary reactor temperatures thus requiring no handling once it is placed in the reactor.

I claim:

1. A process for producing 2,3-dihydropyran which comprises passing tetrahydrofurfuryl alcohol in the vapor phase through a reaction zone maintained at a temperature between about 250° C. and about 350° C. and providing contact with a catalyst comprising from about 85% to about 95% by weight of titanium dioxide and from about 15% to about 5% by weight of aluminum oxide, condensing the product vapors, distilling the resulting condensate to separate dihydropyran from unreacted tetrahydrofurfuryl alcohol, and returning the unreacted alcohol to said reaction zone.

2. A process for producing 2,3-dihydropyran which comprises passing tetrahydrofurfuryl alcohol to a vaporization zone wherein said alcohol is vaporized and entrained in a carrier gas, passing the vaporized and entrained alcohol through a reaction zone maintained at a temperature between about 250° C. and about 350° C. and providing contact with a catalyst comprising from about 85% to about 95% by weight of titanium dioxide and from about 15% to about 5% by weight of aluminum oxide, condensing the product vapors and recycling the carrier gas, distilling the resulting condensate to separate dihydropyran from unreacted tetrahydrofurfuryl alcohol, and returning the unreacted alcohol to said vaporization zone.

3. A process for producing 2,3-dihydropyran which comprises passing tetrahydrofurfuryl alcohol to a vaporization zone maintained at a temperature of between about 175° C. to about 200° C. wherein said alcohol is vaporized and entrained in a carrier gas, passing the vaporized and entrained alcohol through a reaction zone maintained at a temperature between about 280° C. and about 330° C. and providing contact with a catalyst comprising from about 85% to about 95% by weight of titanium dioxide and from about 15% to about 5% by weight of aluminum oxide, condensing the product vapors and recycling the inert carrier gas, distilling the resulting condensate to separate dihydropyran and water of condensation from unreacted tetrahydrofurfuryl alcohol, returning the unreacted alcohol to said vaporization zone, and separating said dihydropyran from said water of condensation.

4. The process of claim 3 in which the carrier gas is nitrogen.

5. The process of claim 3 in which the carrier gas is hydrogen.

6. In a process for producing 2,3-dihydropyran in which tetrahydrofurfuryl alcohol in the vapor phase is contacted with a catalyst at a temperature between about 250° C. and about 350° C., the improvement comprising employing a catalyst containing from about 85% to about 95% by weight of titanium dioxide and from about 15% to about 5% by weight of aluminum oxide.

7. The process according to claim 6 wherein the catalyst contains about 90% by weight of titanium dioxide and about 10% by weight of aluminum oxide.

References Cited in the file of this patent

FOREIGN PATENTS

| 161,088 | Australia | May 1, 1952 |
| 840,844 | Germany | June 5, 1952 |

OTHER REFERENCES

Schniepp et al.: J. Am. Chem. Soc., vol. 68, pp. 1646–1648 (1946).